United States Patent [19]
Van Tilburg et al.

[11] Patent Number: 6,042,006
[45] Date of Patent: Mar. 28, 2000

[54] AUTHENTICATION SYSTEM WHEREIN DEFINITION SIGNALS OF TWO DEVICES ARE ALTERED, COMMUNICATED BETWEEN THE TWO DEVICES, AND COMPARED

[75] Inventors: Johan Van Tilburg, Zoetermeer; Andries Pieter Hekstra, Voorschoten, both of Netherlands

[73] Assignee: Koninklijke PTT Nederland N.V., Groningen, Netherlands

[21] Appl. No.: 08/915,015

[22] Filed: Aug. 20, 1997

[30] Foreign Application Priority Data

Sep. 2, 1996 [NL] Netherlands ............................ 1003939

[51] Int. Cl.[7] ................................ H04L 9/00; G06K 5/00
[52] U.S. Cl. ........................ 235/382.5; 235/380; 235/382; 902/28; 380/24
[58] Field of Search ...................................... 235/379, 380, 235/382, 382.5, 492; 902/2, 26, 28; 380/23, 24

[56] References Cited

U.S. PATENT DOCUMENTS

| | | | |
|---|---|---|---|
| 4,630,201 | 12/1986 | White | 235/379 |
| 5,753,898 | 5/1998 | Hekstra | 235/380 |
| 5,802,176 | 9/1998 | Audebert | 235/382 |

FOREIGN PATENT DOCUMENTS

| | | | |
|---|---|---|---|
| 0 619 565 | 10/1994 | European Pat. Off. . | |
| 0 723 251 | 7/1996 | European Pat. Off. . | |
| 2 600 188 | 12/1987 | France . | |
| 1556241 | 11/1979 | United Kingdom | 902/28 |

OTHER PUBLICATIONS

Textbook entitled "Cryptography: A New Dimension In Computer Data Security—A Guide for the Design and Implementation of Secure Systems", by Carl H. Meyer, et al, published by John Wiley & Sons, 1982, Title page, Table of Contents (ix–xviii), Chapter 2, pp. 13–112; Chapter 4, pp. 192–270; Chapters 10 and 11, pp. 429–606.

Textbook entitled "Contemporary Cryptology The Science of Information Integrity", edited by Gustavus J. Simmons, published by IEEE Press, 1982, Title page, Table of Contents (iii–vi), Chapter 2, pp. 65–134; Chapter 4, pp. 177–288; Chapter 12, pp. 561–613.

*Primary Examiner*—Donald Hajec
*Assistant Examiner*—Drew A. Dunn
*Attorney, Agent, or Firm*—Frishauf, Holtz, Goodman, Langer & Chick, P.C.

[57] ABSTRACT

An authentication system having a first device and a second device between which signals may be communicated. The first device includes a first memory for storing a definition signal and the first device generates a first signal to be communicated to the second device. The first device also generates a first alteration signal, and introduces an alteration into a first section of the definition signal stored in the first memory in accordance with the first alteration signal. The second device includes a second memory for storing the definition signal, and generates, in response to a receipt of the first signal, a second signal to be communicated to the first device. The second signal includes a second section of the definition signal stored in the second memory, and the second device also generates a second alteration signal and introduces an alteration into a third section of the definition signal stored in the second memory in accordance with the second alteration signal. In addition, the first device compares the second section of the definition signal in the second signal originating from the second device with a corresponding section of the definition signal stored in the first memory, and introduces the alteration into the first section of the definition signal stored in the first memory in accordance with a comparison result. The first and third sections, moreover, are corresponding sections of the definition signals stored in the first and second memories, respectively.

14 Claims, 1 Drawing Sheet

AUTHENTICATION SYSTEM WHEREIN DEFINITION SIGNALS OF TWO DEVICES ARE ALTERED, COMMUNICATED BETWEEN THE TWO DEVICES, AND COMPARED

BACKGROUND TO THE INVENTION

The invention relates to a system comprising a first device and a second device, which first device is provided with a first memory means for storing a definition signal, a first generating means for generating a first signal intended for the second device, and which second device is provided with a second memory means for storing the definition signal, and a second generating means for generating, in response to the first signal, the second signal which comprises at least a section of the definition signal stored in the second memory means.

In addition, the first device is provided with first comparison means for comparing at least a section of the second signal originating from the second device with at least a section of the definition signal stored in the first memory means.

Such a system is generally known, and the first device is formed, for example, by a database for the provision of data for payment and the second device then being formed by a terminal. As soon as a coupling has to be brought about automatically (for example, at a fixed instant in time) via, for example, a network, the database generates the first signal intended for the terminal. In response to said first signal, the terminal generates the second signal which is intended for the database and which comprises the definition signal such as, for example, a password. The database compares said password with a password stored in the database and related to said terminal, after which, in the event of them being identical, the terminal is authenticated by the database and the provision of data to the terminal can be started by the database.

Such a system has, inter alia, the disadvantage that if a swindler copies the relevant section of the terminal to a number of private terminals, said swindler could bring about a coupling to the database via any of said private terminals at the expense of a third party.

SUMMARY OF THE INVENTION

The object of the invention is, inter alia, to provide a system of the type mentioned in the preamble which is protected against the ability to bring about couplings to the first device by means of various copies of the second device.

For this purpose, the system according to the invention is characterized in that the first device is provided with a first alteration means for generating, in response to a second alteration signal, a first alteration signal for introducing an alteration into at least a section of the definition signal stored in the first memory means, the second device being provided with a second alteration means for generating the second alteration signal for introducing an alteration into at least a section of the definition signal stored in the second memory means.

By arranging for the second device to introduce, by means of the second alteration signal, an alteration in at least a section of the definition signal stored in the second device and by arranging for the first device, in response to said second alteration signal, to introduce, by means of the first alteration signal, an alteration in at least a section of the definition signal stored in the first device, the result is achieved that the definition signal is altered, for example every time a coupling is brought about. As a consequence thereof, it is no longer possible to bring about couplings to the first device by means of various copies of the second device. At the very most, a coupling could be brought about to the first device by means of a copy of the second device provided said copy is made and is used in the time interval which is situated between two couplings to the first device brought about by means of the legitimate second device. However, in that case, the fraud will quickly be discovered because the first subsequent coupling to the first device to be brought about by means of the legitimate second device will no longer be successful. In this connection, the second alteration signal can be transmitted to the first device either as a component of the second signal or separately from the second signal.

The invention is based, inter alia, on the insight that at least a section of the definition signal should be regularly altered and that such alterations can best be initiated from the second device.

The problem of being able to bring about a coupling to the first device by means of various copies of the second device is therefore solved by introducing alterations from the second device in the definition signal stored in both the second device and the first device.

It should be pointed out that it is known per se to include in known systems of the type mentioned in the preamble a counter reading in the definition signal, the counter reading being increased every time a coupling is brought about. Such an alteration is, however, initiated from the first device and is, in addition, predictable. The alteration to be introduced into the definition signal in the system according to the invention is initiated from the second device, is of a random nature and is preferably not predictable.

A first embodiment of the system according to the invention is characterized in that the first device is provided with first random generating means for generating a first random number, the first signal being a first function of the first random number and the second signal being a second function of the first random number.

As a result of using the first (pseudo)random generating means, particularly in combination with the alteration to be introduced, the coupling situated between the first device and the second device is protected against possible tappings and/or interceptions. Roughly speaking, at least two possibilities arise in this connection. Firstly, the first random number could be fed by means of the first signal to the second device, in which said first random number could then be encrypted by means of a key (possibly supplemented by a signal derived from a pin code), after which the result is fed by means of the second signal to the first device, in which the whole can then be deciphered by means of the key (possibly supplemented by the signal derived from the pin code). Secondly, the first random number could be encrypted in the first device by means of a key (possibly supplemented by a signal derived from a pin code), after which the result is fed by means of the first signal to the second device, in which the whole can then be deciphered by means of the key (possibly supplemented by the signal derived from the pin code), after which the first random number is fed to the first device by means of the second signal. In both cases, the alteration to be transmitted by means of the second signal or separately therefrom can be involved in all this in various ways (for example, by encrypting the alteration with the first random number).

A second embodiment of the system according to the invention is characterized in that the second device is provided with second random generating means for generating a second random number, the first alteration signal being a first function of the second random number and the second alteration signal being a second function of the second random number.

As a result of using the second (pseudo)random generating means, the alteration to be introduced is brought about in an unpredictable way, which further protects the coupling situated between the first device and the second device against possible tappings and/or interceptions, particularly in combination with the use of the first (pseudo)random generating means.

A third embodiment of the system according to the invention is characterized in that the first device is provided with first designation means for generating a designation for designating a certain section of the definition signal, the first signal comprising the designation.

A fourth embodiment of the system according to the invention is characterized in that the second device is provided with second designation means for generating, in response to the designation, the second signal which comprises a section, designated by the designation, of the definition signal stored in the second memory means.

A fifth embodiment of the system according to the invention is characterized in that the second device is provided with third designation means for generating the second alteration signal for introducing an alteration into a section of the definition signal stored in the second memory means.

As a result of using the first designation means, the section of the definition signal which should be used during the authentication is specified by the first device. In this connection, the definition signal is located, for example, in a memory of which a first section comprises, for example, personal, fixed data of a user, of which a second section comprises defined data of the user and of which a third section comprises, for example, general, varying data of the user. Alterations for the purpose of protecting the authentication process will then generally take place in the second section by using the third designation means (both the location and the content could be altered by means of the second random generating means), while the section to be transmitted of the definition signal could be assembled in a random way from sections of each of the three sections by using the second designation means.

A sixth embodiment of the system according to the invention is characterized in that the first generating means generate the first signal in response to an identification signal.

If the system relates to a smart card system, the first device being a smart-card terminal/network and the second device then being a smart card, the smart-card terminal/network should generally receive an identification signal which originates either directly from the user or from the smart-card. The said first section of the memory could then comprise the name, the private address and telephone number, the business address and telephone number, and bank account number, and the third section of the memory could then comprise, for example, a bank account balance.

It should further also be pointed out that, if the first and second (pseudo)random generating means are used, even the use of a so-called simple encryptment algorithm already has the result that it becomes completely pointless for criminals to tap and/or to intercept signals which are transmitted by means of the coupling situated between the first device and the second device.

The invention furthermore relates to a first device provided with a first memory means for storing a definition signal, a first generating means for generating a first signal intended for a second device, and a first comparison means for comparing at least a section of a second signal originating from the second device with at least a section of the definition signal stored in the first memory means.

The first device according to the invention is characterized in that the first device is provided with a first alteration means for generating, in response to a second alteration signal originating from the second device, a first alteration signal for introducing an alteration into at least a section of the definition signal stored in the first memory means.

A first embodiment of the first device according to the invention is characterized in that the first device is provided with first random generating means for generating a first random number, the first signal being a first function of the first random number and the second signal being a second function of the first random number.

A second embodiment of the first device according to the invention is characterized in that the first device is provided with first designation means for generating a designation for designating a certain section of the definition signal, the first signal comprising the designation.

A third embodiment of the first device according to the invention is characterized in that the first generating means generate the first signal in response to an identification signal.

The invention furthermore relates to a second device provided with a second memory means for storing a definition signal, and a second generating means for generating, in response to a first signal originating from a first device, a second signal which is intended for the first device and which comprises at least a section of the definition signal stored in the second memory means.

The second device according to the invention is characterized in that the second device is provided with a second alteration means for generating the second alteration signal for introducing an alteration into at least a section of the definition signal stored in the second memory means.

A first embodiment of the second device according to the invention is characterized in that the second device is provided with second random generating means for generating a second random number, a first alteration signal to be generated by the first device being a first function of the second random number and the second alteration signal being a second function of the second random number.

A second embodiment of the second device according to the invention is characterized in that the second device is provided with second designation means for generating, in response to a designation, the second signal which comprises a section, designated by the designation, of the definition signal stored in the second memory means.

A third embodiment of the second device according to the invention is characterized in that the second device is provided with third designation means for generating the second alteration signal for introducing an alteration into a section of the definition signal stored in the second memory means.

The invention also relates to a method for the authentication by a first device of a second device, comprising the steps of the generation by the first device of a first signal intended for the second device, the generation by the second device, in response to the first signal, of a second signal which is intended for the first device and which comprises at least a section of a definition signal stored in the second device, the comparison by the first device of at least a section of the second signal originating from the second device with at least a section of a definition signal stored in the first device.

The method according to the invention is characterized in that the method comprises the steps of the generation by the second device of a second alteration signal for introducing an alteration into at least a section of the definition signal stored in the second device, the generation by the first device, in response to the second alteration signal, of a first alteration signal for introducing an alteration into at least a section of the definition signal stored in the first device.

A first embodiment of the method according to the invention is characterized in that the method comprises the step of the generation by the first device of a first random number, the first signal being a first function of the first random number and the second signal being a second function of the first random number.

A second embodiment of the method according to the invention is characterized in that the method comprises the step of the generation by the second device of a second random number, the first alteration signal being a first function of the second random number and the second alteration signal being a second function of the second random number.

A third embodiment of the method according to the invention is characterized in that the method comprises the steps of the generation by the first device of a designation for designating a certain section of the definition signal stored in the first device, the first signal comprising the designation, the generation by the second device, in response to the designation, of the second signal which comprises a section, designated by the designation, of the definition signal stored in the second device, and the generation by the second device of the second alteration signal for introducing an alteration into a section of the definition signal stored in the second device.

A fourth embodiment of the method according to the invention is characterized in that the method comprises the step of the reception by the first device of an identification signal for generating, in response to the identification signal, the first signal.

References

"Contemporary Cryptology", The Science of Information Integrity, edited by Gustavus J. Simmons, IEEE press, 1992

"Cryptography: a new dimension in computer data security". A guide for the Design and Implementation of Secure Systems", by Carl H. Meyer and Stephen M. Matyas, A Wiley-Interscience Publication, John Wiley & Sons, 1982

All references are deemed to be incorporated in this patent application.

BRIEF DESCRIPTION OF THE DRAWINGS

The invention will be explained in greater detail by reference to an exemplary embodiment shown in the figure. In the figure.

DETAILED DESCRIPTION

Figure 1:
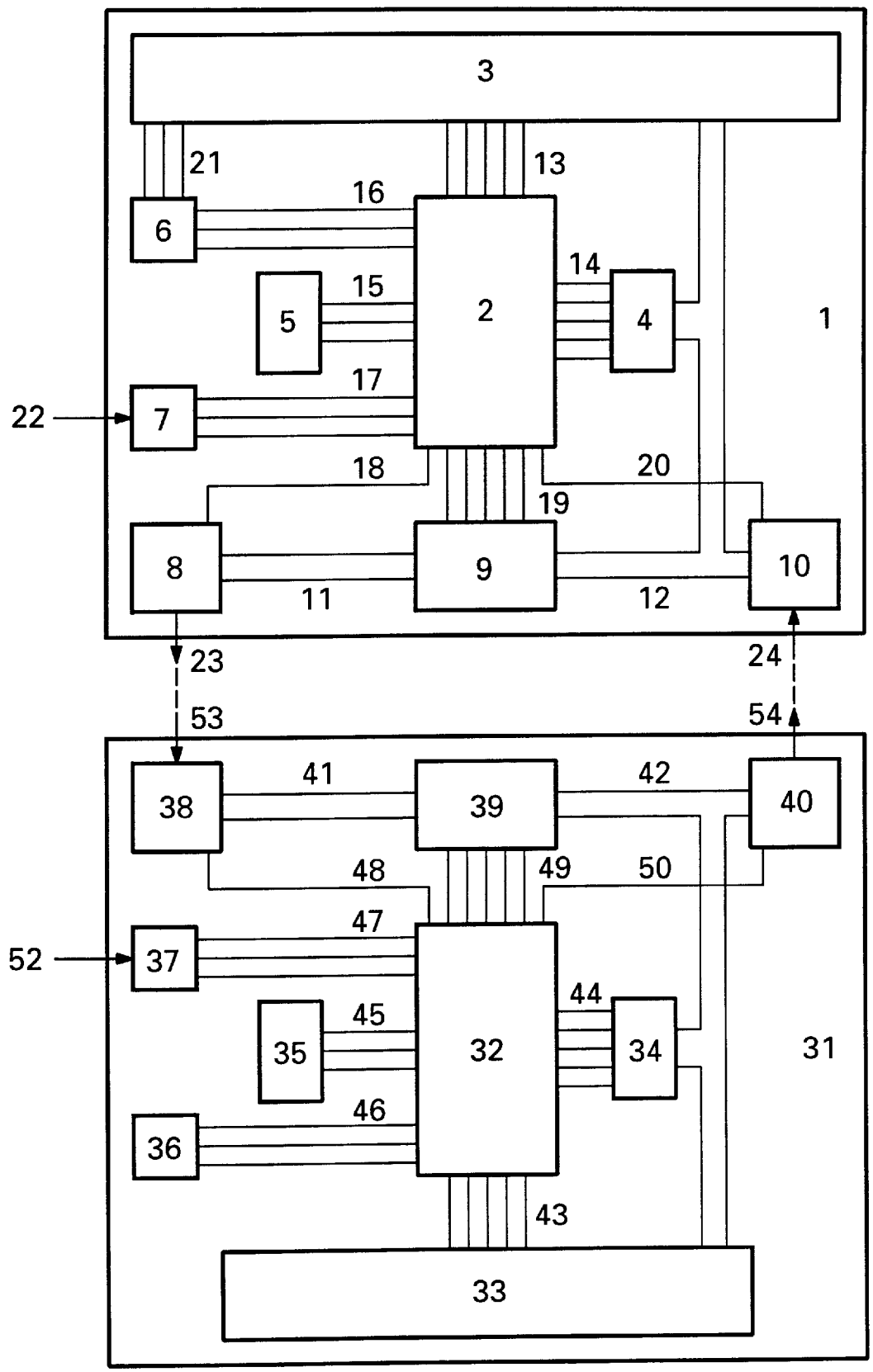
FIG. 1 shows a system according to the invention, comprising a first device according to the invention and a second device according to the invention.

The system according to the invention shown in FIG. 1 comprises a first device 1 according to the invention. The first device 1 is provided with first processor means 2. The latter are connected via a connection 13 to first memory means 3, via a connection 14 to first buffer means 4, via a connection 15 to first random generating means 5, via a connection 16 to a first working memory 6, which is connected via a connection 21 to first memory means 3, via a connection 17 to a first pin-code receiver 7, to which a pin-code should be fed via an input 22, from which pin code the first pin-code receiver 7 generally derives, in a manner known to the person skilled in the art, a signal which is stored in the first pin-code receiver 7, via a connection 18 to first generating means 8, which can generate a first signal via an output 23, via a connection 19 to first encryption/decryption means 9 and via a connection 20 to first receiving means 10 which can receive a second signal via an input 24. The first generating means 8 and the first encryption/decryption means 9 are mutually coupled via a bus 11, and the first encryption/decryption means 9 and the first receiving means 10 and the first buffer means 4 and the first memory means 3 are mutually coupled via a bus 12.

Furthermore, the system according to the invention shown in FIG. 1 comprises a second device 31 according to the invention. The second device 31 is provided with second processor means 32. These are connected via a connection 43 to second memory means 33, via a connection 44 to second buffer means 34, via a connection 45 to second random generating means 35, via a connection 46 to a second working memory 36, via a connection 47 to a second pin-code receiver 37 to which the pin code could be fed via an input 52 although, if the pin code has already been received by the first device 1 and a signal derived therefrom is stored, it is not generally usual for the second pin-code receiver 37 also to receive the pin code, but on the contrary, it is usual for the signal derived from the pin code already to be stored in the second pin-code receiver, via a connection 48 to second receiving means 38 which can receive via an input 53 the first signal, via a connection 49 to second encryption/decryption means 39 and via a connection 50 to second generating means 40 which can generate via an output 54 the second signal. The second receiving means 38 and the second encryption/decryption means 39 are mutually coupled via a bus 41, and the second encryption/decryption means 39 and the second generating means 40 and the second memory means 33 are mutually coupled via a bus 42.

The operation of the system shown in FIG. 1 is, for example, as follows. As soon as the second device 31, such as, for example, a smart card, is brought into contact with the first device 1, such as, for example, a terminal, this is detected, for example, as follows, by the terminal 1. The processor means 2 regularly instruct, via the connection 18, the generating means 8 to generate a reply signal which, as soon as the contact has been made via the output 23 and the input 53, is fed to the smart card 31. The receiving means 38 receive said reply signal and inform, via the connection 48, the processor means 32, which, in response thereto, instruct the memory means 33 via the connection 43 to read out a section of a definition signal stored in the memory means 33, which section comprises an identity signal of a user of the smart card 31. Said identity signal is fed via the connection 43 through the processor means 32 and via the connection 50 to generating means 40 which transmit the identity signal via the output 54 to the terminal 1.

In the terminal 1, the identity signal is fed via the input 24 to the receiving means 10. Via the connection 20, the identity signal is then fed to the processor means 2 which, in response thereto, instruct the working memory 6 via the connection 16 (possibly via the connection 21 and the memory means 3) to generate a key signal and to store the identity signal in the working memory 6. Furthermore, the processor means 2 instruct the random generating means 5 via the connection 15 to generate a random number and they instruct the pin-code receiver 7 via the connection 17 to generate a signal derived from a pin code (which pin code should be fed in by a user, for example via the input 22, or which signal derived from the pin code is possibly already stored in encrypted form in the pin-code receiver 7). The key signal is fed to the processor means 2 via the connection 16 (and possibly the connection 21). The random number is fed via the connection 15 to the processor means 2 which, via the connection 16, arrange for said random number to be stored in the working memory 6 in a manner related to the identity signal. The signal derived from the pin code is fed to the processor means 2 via the connection 17. The key signal, the random number and the signal derived from the pin code are then fed via the connection 19 to the encryption/decryption means 9 which, for example, encrypt the random number on the basis of the key signal which is supplemented by the signal derived from the pin code. The encrypted whole is then transmitted via the bus 11 and the generating means 8 and the output 23 as the first signal to the smart card 31.

In the smart card 31, the first signal is received via the input 53 and the receiving means 38 and is fed via the bus 41 to the encryption/decryption means 39. The processor means 32 are informed via the connection 48 of the arrival of the first signal and instruct the working memory 36 via the connection 46 to generate a key signal and, via the connection 47, they instruct the pin-code receiver 37 to generate a signal derived from a pin code (which pin code should be fed in by a user, for example via the input 52, or which signal derived from the pin code is possibly already stored in encrypted form in the pin-code receiver 37). The key signal is fed to the processor means 32 via the connection 46. The signal derived from the pin code is fed to the processor means 32 via the connection 47. The key signal and the signal derived from the pin code is then fed via the connection 49 to the encryption/decryption means 39 which, on the basis of the key signal, which is supplemented by the signal derived from the pin code, decrypt the first signal, which yields the random number. Said random number is fed via the connection 49 to the processor means 32 which, via the connection 46, arrange for said random number to be stored in the working memory 36. The processor means 32 instruct the memory means 33 via the connection 43 to read out a section of the definition signal stored in the memory means 33, which section comprises a characteristic signal of the user of the smart card 31. Said characteristic signal is fed by the processor means 32 via the bus 42 to the encryption/decryption means 39, which are furthermore fed via the connection 49 and the processor means 32 and the connection 46 with the random number stored in the working memory 36 and which encrypt the characteristic signal on the basis of said random number. The encrypted whole is then transmitted via the bus 42 and the generating means 40 and the output 54 as the second signal to the terminal 1.

In the terminal 1, the second signal is fed to the receiving means 10 via the input 24. The second signal is then fed to the encryption/decryption means 9 via the bus 12. The processor means 2 instruct the working memory 6 via the connection 16 to generate the random number stored therein (which is stored therein in a manner related to the identity signal). Via the connection 16, the random number is fed to the processor means 2. The random number is then fed via the connection 19 to the encryption/decryption means 9 which decrypt the second signal therewith, which yields the characteristic signal. Said characteristic signal is then fed via the bus 12 to the buffer means 4 which temporarily store the characteristic signal, while the processor means instruct the memory means 3 via the connection 13 to generate via the bus 12 a characteristic signal stored therein (which, for example, is stored therein either in a manner related to the identity signal or in a manner related to the characteristic signal). The two characteristic signals are then compared by means of the processor means 2 and the buffer means 4 and, in the event of them being identical, this is detected by the processor means 2. The validity of the smart card can thus be established, while the identity of the user is established by using the pin code. In this connection, the disadvantage arises that clones of the smart card can be made with which fraud can then be perpetrated both if no use is made of pin-code signals and if use is in fact made of pin-code signals which are known to swindlers. This problem is solved advantageously by the system according to the invention shown in FIG. 1 and, to be specific, as follows.

In the smart card 31, instruction is again given to the memory means 33 in response to the storage in the working memory 36 of the random number by the processor means 32 via the connection 43 to read out a (same or different) section of the definition signal stored in the memory means 33, which section comprises a (same or different) characteristic signal of the user of the smart card 31. Said characteristic signal is fed via the bus 42 by the processor means 32 to the buffer means 34, which temporarily store said characteristic signal. Furthermore, the processor means 32 instruct the random generating means 35 via the connection 45 to generate a further random number. Said further random number is fed via the connection 45 to the processor means 32, which, on the basis of said further random number, introduce an alteration into the characteristic signal stored in the buffer means 34 (for example, by determining, via the further random number locations, bits to be inverted and/or by carrying out an arithmetical operation on the same or another characteristic signal by means of the further random number). The characteristic signal altered in this way is then fed via the bus 42 to the encryption/decryption means 39, which are furthermore fed with the random number stored in the working memory 36 via the connection 49 and the processor means 32 and the connection 46 and which, on the basis of said random number, encrypt the altered characteristic signal. The encrypted whole is then transmitted to the terminal 1 via the bus 42 and the generating means 40 and the output 54 as a second alteration signal. In this connection, such a second alteration signal can either be transmitted as a component of the second signal or separately from the second signal.

In the terminal 1, the second alteration signal is fed to the receiving means 10 via the input 24. The second alteration signal is then fed to the encryption/decryption means 9 via the bus 12. The processor means 2 instruct the working memory 6 via the connection 16 to generate the random number stored therein. The random number is fed to the processor means 2 via the connection 16. The random number is then fed via the connection 19 to the encryption/decryption means 9, which decrypt therewith the second alteration signal, which yields a first alteration signal in the form of the altered characteristic signal. Said altered characteristic signal is then fed via the bus 12 to the buffer means 4, which temporarily store said altered characteristic signal, after which the processor means instruct the memory means 3 via the connection 13 to arrange for a characteristic signal stored therein to be replaced by the altered characteristic signal stored in the buffer means 4 via the bus 12. Thus, after the validity of the smart card and the identity of the user have been established, a section of the definition signal can be altered. This has the result that, if clones are made of the smart card, the clones can no longer function in the event of a previous contact between the official smart card and a terminal and, in the event of a previous contact between a cloned smart card and a terminal, the official smart card and the other clones can no longer function. In both cases, fraud is prevented and/or rapidly discovered.

Of course, the possibilities also include not using the signal derived from the pin code in the terminal 1 for supplementing the key signal, but subsequently using said signal derived from the pin code in the terminal 1 to check the identity of the user, that is to say after the validity of the smart card has been established.

Another operation of the system shown in FIG. 1 could be as follows, for example. As soon as the second device 31, such as, for example, a smart card, is brought into contact with the first device 1, such as, for example, a terminal, a user generates a pin code which is received via the input 22 by the pin-code receiver 7, after which the pin-code receiver 7 derives a signal from said pin code which signal derived from the pin code is stored in the pin-code receiver 7. The processor means 2 are informed thereof via the connection 17, in response to which the processor means 2 instruct the random generating means 5 via the connection 15 to generate a random number. Via the connection 15, the random number is fed to the processor means 2, which arrange for said random number to be stored in the working memory 6 via the connection 16 (which storage is carried out this time in a manner not related to the identity signal). The signal derived from the pin code is fed via the connection 17 to the processor means 2. The random number and the signal derived from the pin code are then fed via the connection 19 to the encryption/decryption means 9, which encrypt, for example the random number, on the basis of the signal derived from the pin code. The encrypted whole is then transmitted via the bus 11 and the generating means 8 and the output 23 as the first signal to the smart card 31.

In the smart card 31, the first signal is received via the input 53 and the receiving means 38 and fed to the encryption/decryption means 39 via the bus 41. The processor means 32 are informed via the connection 48 of the arrival of the first signal and instruct the pin-code receiver 37 via the connection 47 to generate a signal derived from a pin code (which pin code should be fed in, for example via the input 52, by a user or which signal derived from the pin code is possibly already stored in the pin-code receiver 37 in encrypted form). The signal derived from the pin code is fed to the processor means 32 via the connection 47. The signal derived from the pin code is then fed via the connection 49 to the encryption/decryption means 39, which, on the basis of the signal derived from the pin code, decrypt the first signal, which yields the random number. Said random number is fed via the connection 49 to the processor means 32, which arrange for said random number to be stored in the working memory 36 via the connection 46. The processor means 32 instruct the memory means 33 via the connection 43 to read out a section of the definition signal stored in the memory means 33, which section comprises a characteristic signal of the user of the smart card 31. Said characteristic signal is fed by the processor means 32 via the bus 42 to the encryption/decryption means 39, which are furthermore fed with the random number stored in the working memory 36 via the connection 49 and the processor means 32 and the connection 46 and which, on the basis of said random number encrypt the characteristic signal. The encrypted whole is transmitted to the terminal 1 via the bus 42 and the generating means 40 and the output 54 as the second signal.

In the terminal 1, the second signal is fed to the receiving means 10 via the input 24. The second signal is then fed via the bus 12 to the encryption/decryption means 9. The processor means 2 instruct the working memory 6 via the connection 16 to generate the random number stored therein. The random number is fed to the processor means 2 via the connection 16. The random number is then fed via the connection 19 to the encryption/decryption means 9, which decrypt the second signal therewith, which yields the characteristic signal. Said characteristic signal is then fed via the bus 12 to the buffer means 4, which temporarily store the characteristic signal, while the processor means instruct the memory means 3 via the connection 13 to generate a characteristic signal stored therein (which is stored therein, for example, in a manner related to the characteristic signal) via the bus 12. Both characteristic signals are then compared by means of the processor means 2 and the buffer means 4 and, in the event of them being identical, this is detected by the processor means 2. The validity of the smart card can thus be established, while the identity of the user can be established by using the pin code. In this connection, the disadvantage arises that, both if no use is made of pin-code signals and if use is in fact made of pin-code signals, which are known to swindlers, clones can be made of the smart card with which fraud can then be perpetrated. This problem is advantageously solved by the system according to the invention shown in FIG. 1, and specifically, as follows.

In the smart card 31, the memory means 33 are again instructed via the connection 43 by the processor means 32, in response to the storage in the working memory 36 of the random number, to read out a (same or different) section of the definition signal stored in the memory means 33, which section comprises a (same or different) characteristic signal of the user of the smart card 31. Said characteristic signal is fed by the processor means 32 via the bus 42 to the buffer means 34, which temporarily store said characteristic signal. Furthermore, the processor means 32 instruct the random generating means 35 via the connection 45 to generate a further random number. Said further random number is fed via the connection 45 to the processor means 32, which, on the basis of said further random number, introduce an alteration into the characteristic signal stored in the buffer means 34 (for example by determining, via the further random number locations, bits to be inverted and/or by carrying out an arithmetical operation on the characteristic signal by means of the further random signal). The characteristic signal altered in this way is then fed via the bus 42 to the encryption/decryption means 39, which are furthermore fed with the random number stored in the working memory 36 via the connection 49 and the processor means 32 and the connection 46 and which, on the basis of said random number, encrypt the altered characteristic signal. The encrypted whole is then transmitted to the terminal 1 via the bus 42 and the generating means 40 and the output 54 as a second alteration signal. In this connection, such a second alteration signal can be transmitted either as a component of the second signal or separately from the second signal.

In the terminal 1, the second alteration signal is then fed via the input 24 to the receiving means 10. The second alteration signal is then fed to the encryption/decryption means 9 via the bus 12. The processor means 2 instruct the working memory 6 via the connection 16 to generate the random number stored therein. The random number is fed to the processor means 2 via the connection 16. The random number is then fed via the connection 19 to the encryption/ decryption means 9, which decrypt the second alteration signal therewith, which yields a first alteration signal in the form of the altered characteristic signal. Said altered characteristic signal is then fed via the bus 12 to the buffer means 4, which temporarily store said altered characteristic signal, after which the processor means instruct the memory means 3 via the connection 13 to arrange for the characteristic signal stored therein to be replaced via the bus 12 by the altered characteristic signal stored in the buffer means 4. Thus, after the validity of the smart card and the identity of the user has been established, a section of the definition signal can be altered. This has the result that, if clones of the smart card are made, the clones no longer function in the event of a previous contact between the official smart card and the terminal and, in the event of a previous contact between a cloned smart card and a terminal, the official smart card and the other clones no longer function. In both cases fraud is prevented and/or rapidly discovered.

In the first device 1, the first processor means 2 thus function, inter alia, as first alteration means and as first comparison means. In the second device 31, the second processor means 32 function, inter alia, as second alteration means. As a result of using the first random generating means 5 and the second random generating means 35, even the use of a so-called simple encrypting algorithm already has the result that it becomes impossible for criminals to tap and/or to intercept signals which are transmitted via a coupling situated between the first device and the second device. Both random generating means 5 and 35 are therefore not necessarily present for the purpose of protecting the mutual communication between the two devices 1 and 31. In particular, the second random generating means 35 can, however, yield a further advantage by imparting a random nature to the alteration to be introduced.

The definition signal stored both in the memory means 3 and in the memory means 33 is composed, for example, of 64,000 bits, of which, for example, 8000 bits form a first section (a first characteristic signal) which comprises, for example, personal, fixed data of a user, of which, for example, 48,000 bits form a second section (a second characteristic signal) which comprises, for example, defining data of the user (which are therefore altered, according to the invention, during any interaction between the two devices) and of which, for example, 8000 bits form a third section (a third characteristic signal) which comprises, for example, general, varying data (such as financial credits) of the user. The first processor means 2 could then furthermore function as first designation means, in which case, for example, instead of the random number or to supplement said random number, a code (a so-called designation) generated by the first processor means 2 is transmitted which, for example, designates (a section of) the first characteristic signal, in response to which the second processor means 32, which could furthermore function as second designation means, instruct the memory means 33 to read out (said section of) said first characteristic signal etc. The second processor means 32 and/or the second random generating means 35 could furthermore function as third designation means, in which case, for example, bits on locations, specified by the third designation means, within the second characteristic signal are altered as a function of the further random number or in which case, for example, bits on locations specified by the further random number within the second characteristic signal are inverted.

Furthermore, it should also be pointed out that, to the extent that the alteration to be introduced into the definition signal takes place in a smaller section of said definition signal, this promotes the protection of the system, on the one hand, while the protection of the system decreases, on the other hand. On the one hand, it will, after all, become increasingly more difficult for swindlers to determine the small section in which the alteration takes place, while, on the other hand, the possibility that swindlers already precisely predict the alteration by speculation in fact increases. As a consequence thereof, according to a preferred embodiment, the alteration will take place several times (iteratively) for each interaction between the two devices, in which case the possibilities include both performing a further comparison for each alteration and making do with fewer comparisons than the number of alterations, with only one comparison at the beginning of the interaction in the minimum case.

A totally different use of the invention relates to the protection of video signals. Thus, in the case of a so-called video broadcast system, a receiver/decoder could be designed which in fact only decodes/decrypts if an interaction takes place with a master system with a certain regularity (via, for example, an optionally cordless telephone connection and/or via a cable company and/or via a satellite etc.), in which case the receiver/decoder is based on the second device, while the master system is based on the first device. In a further case, even video carrier systems, such as video recorders which function using video tapes or video equipment which functions by means of nonmechanical video memories could also be protected. In this case, the video recorder or the video equipment functions as the first device in which a decoder should be fitted which functions as the second device, in which case such a decoder then uses the video tape or the nonmechanical video memory as the memory means. The definition signal therefore then forms a component of and/or is added to the stored video signal.

We claim:

1. A system comprising a first device, a second device and communication means for communicating signals between the first and second devices,
   (i) wherein the first device comprises:
      first memory means for storing a definition signal,
      first generating means for generating a first signal to be communicated to the second device,
      first alteration means for generating a first alteration signal and for introducing an alteration into a first section of the definition signal stored in the first memory means in accordance with the first alteration signal;
   (ii) wherein the second device comprises:
      second memory means for storing the definition signal,
      second generating means for generating, in response to a receipt of the first signal via the communication means, a second signal to be communicated to the first device, said second signal comprising a second section of the definition signal stored in the second memory means, and
      second alteration means for generating a second alteration signal and introducing an alteration into a third section of the definition signal stored in the second memory means in accordance with the second alteration signal;
   (iii) wherein the first device further comprises comparison means for comparing said second section of the definition signal in the second signal originating from the second device with a corresponding section of the definition signal stored in the first memory means; and
   (iv) wherein the first alteration means introduces said alteration into said first section of the definition signal stored in the first memory in accordance with a comparison result output by the comparison means, and wherein the first and third sections are corresponding sections of the definition signals stored in the first and second memory means, respectively.

2. The system of claim 1, wherein the first device is provided with first random generating means for generating a first random number, and wherein the first signal is a first function of the first random number.

3. The system according to claim 1, wherein the first device is provided with first random generating means for generating a first random number, and wherein the first signal is a first function of the first random number and the second signal is a second function of the first random number.

4. The system according to claim 3, wherein the second device is provided with second random generating means for generating a second random number, and wherein the first alteration signal is a first function of the second random number and the second alteration signal is a second function of the second random number.

5. The system according to claim 1, wherein the first device is provided with first designation means for generating a designation for designating a section of the definition signal, and wherein the first signal comprises the designation.

6. The system according to claim 5, wherein the second device is provided with second designation means for causing the second signal generating means to generate the second signal in response to the designation, and wherein the second signal comprises a section, designated by the designation, of the definition signal stored in the second memory means.

7. The system according to claim 6, wherein the second device is provided with third designation means for causing the second alteration means to generate the second alteration signal and introduce said alteration into the third section of the definition signal which is designated by the third designation means.

8. The system according to claim 1, wherein the first generating means generates the first signal in response to an identification signal.

9. A method for the authentication by a first device of a second device, comprising the steps of:

generating, by means of the first device, a first signal intended for the second device, and communicating the first signal to the second device;

generating, by means of the second device, in response to the communicated first signal, a second signal including a first section of a definition signal stored in a memory of the second device, and communicating the second signal to the first device;

generating, by means of the second device, an alteration signal;

introducing, by means of the second device, an alteration into a second section of the definition signal stored in the second device using said alteration signal;

communicating said alteration signal to the first device;

comparing, by means of the first device, said first section of the definition signal in the second signal originating from the second device with a corresponding section of the definition signal stored in a memory of the first device, and outputting a comparison result; and introducing an alteration into a third section of the definition signal stored in the memory of the first device in accordance with the comparison result and using said alteration signal;

wherein the second and the third sections are corresponding sections of the definition signals stored in the memories of the first and second devices, respectively.

10. The method of claim 9, further comprising a step of generating, by means of the first device, a first random number, and wherein the first signal is a first function of the first random number.

11. The method of claim 9, further comprising a step of generating, by means of the first device, a first random number, and wherein the first signal is a first function of the first random number and the second signal is a second function of the first random number.

12. The method of claim 11, further comprising a step of generating, by means of the second device, a second random number, and wherein said alteration signal is a function of the second random number.

13. The method of claim 9, further comprising the steps of:

generating, by means of the first device, a first designation for designating the first section of the definition signal, said first designation being included in the first signal;

generating, by means of the second device, in response to the designation, the second signal which comprises said first section, designated by said first designation, of the definition signal stored in the memory of the second device; and generating, by means of the second device, the second alteration signal and introducing said alteration into the second section of the definition signal which is designated by a second designation included in the second alteration signal.

14. The method of claim 9, further comprising a step of receiving, by means of the first device, an identification signal for generating, in response to the identification signal, the first signal.

* * * * *